United States Patent
Kawai

(10) Patent No.: US 9,454,386 B2
(45) Date of Patent: Sep. 27, 2016

(54) IMAGE FORMING APPARATUS AND METHOD THAT REALIZE FUNCTION BY INSTALLED APPLICATION

(71) Applicant: KYOCERA Document Solutions Inc., Osaka (JP)

(72) Inventor: Takanao Kawai, Osaka (JP)

(73) Assignee: KYOCERA Document Solutions Inc. (JP)

( * ) Notice: Subject to any disclaimer, the term of this patent is extended or adjusted under 35 U.S.C. 154(b) by 331 days.

(21) Appl. No.: 14/169,550

(22) Filed: Jan. 31, 2014

(65) Prior Publication Data

US 2014/0215499 A1    Jul. 31, 2014

(30) Foreign Application Priority Data

Jan. 31, 2013    (JP) .................................. 2013-016688

(51) Int. Cl.
*G06F 9/445*    (2006.01)
(52) U.S. Cl.
CPC .................................. *G06F 9/44536* (2013.01)
(58) Field of Classification Search
None
See application file for complete search history.

(56) References Cited

U.S. PATENT DOCUMENTS

| | | | |
|---|---|---|---|
| 6,349,408 B1 * | 2/2002 | Smith ...................... G06F 9/445 717/168 |
| 2002/0054326 A1 | 5/2002 | Morita | |
| 2004/0075857 A1 * | 4/2004 | Akiyoshi ................ G06F 9/445 358/1.13 |
| 2006/0158675 A1 | 7/2006 | Morita | |
| 2006/0164670 A1 | 7/2006 | Morita | |
| 2008/0034060 A1 * | 2/2008 | Fisher, Jr. ............. G06F 9/4446 709/218 |
| 2010/0281456 A1 * | 11/2010 | Eizenman ................ G06F 8/20 717/104 |
| 2012/0198104 A1 * | 8/2012 | Miyachi .............. G06F 21/6218 710/36 |
| 2012/0224210 A1 | 9/2012 | Morita | |

FOREIGN PATENT DOCUMENTS

JP          2002-082806 A       3/2002

* cited by examiner

Primary Examiner — Tuan Dao
(74) Attorney, Agent, or Firm — McDonnell Boehnen Hulbert & Berghoff LLP

(57) ABSTRACT

An image forming apparatus that realizes one or more functions based on a device by using an installed application includes a plurality of devices, a controller, a set of APIs, and an application platform. The plurality of devices includes a printing device. The controller executes a plurality of actual processes that control the plurality of devices. The set of APIs call the plurality of actual processes. The application platform provides each API from the set of APIs to the application. The controller further includes a support determination unit that determines, for an API from the set of APIs, whether the API is supported by the image forming apparatus based on the information for support determination of the API.

12 Claims, 4 Drawing Sheets

IMAGE FORMING APPARATUS AND METHOD THAT REALIZE FUNCTION BY INSTALLED APPLICATION

RELATED APPLICATIONS

This application is based upon, and claims priority to corresponding Japanese Patent Application No. 2013-016688, filed in the Japan Patent Office on Jan. 31, 2013, the entire contents of which are incorporated herein by reference.

FIELD

Unless otherwise indicated herein, the description in this field section or the background section is not prior art to the claims in this application and is not admitted to be prior art by inclusion in this section. The present disclosure generally relates to an image forming apparatus that realizes one or more functions based on a device by using an installed application.

BACKGROUND

A typical image forming apparatus that realizes one or more functions based on a device by using an installed application includes an application platform having a plurality of application program interfaces (APIs) for calling an actual process that controls the device.

The typical image forming apparatus includes the application platform in the firmware of the image forming apparatus. Therefore, a new application platform needs to be developed for each new model of the image forming apparatus. Further, a new API may need to be added to the application platform that is supported by the image forming apparatus for each new model.

In an example scenario, an application calls an API that is included on a new application platform, but was not previously included on an old application platform. When an image forming apparatus is provided with the new application platform, an application that calls the API included on that new platform will operate normally. However, if the image forming apparatus is provided with the old application platform that does not include the API called by an application, the application will not operate normally, but may instead discontinue operation, for example.

Therefore, a developer of the application needs to pay attention to which image forming apparatus model supports which API. In addition, a developer of an application must be aware of the capabilities and restrictions of a specific model, such as buttons present on a graphical user interface (GUI), for example. An application developed for one image forming apparatus model such that running that application on a different image forming apparatus may result in failure because of different capabilities and restrictions. In other words, the typical image forming apparatus imposes a heavy load on the development of the application.

SUMMARY

The present disclosure relates to an image forming apparatus and a method capable of reducing load on development of an application.

According to an embodiment of the present disclosure, the image forming apparatus that realizes one or more functions based on a device by using an installed application includes a plurality of devices, a controller, a set of APIs, and an application platform. The plurality of devices includes a printing device. The controller executes a plurality of actual processes that control the plurality of devices. The set of APIs call the plurality of actual processes. The application platform provides each API from the set of APIs to the application. The controller further includes a support determination unit that determines, for an API from the set of APIs, whether the API is supported by the image forming apparatus based on the information for support determination of the API.

According to an embodiment of the present disclosure, the method that realizes one or more functions based on a device by using an installed application in an image forming apparatus, includes: executing a plurality of actual processes that control a plurality of devices via a controller; calling the plurality of actual processes via a set of APIs; and providing each API from the set of APIs to the application via an application platform. The controller includes a support determination unit that determines, for an API from the set of APIs, whether the API is supported by the image forming apparatus based on information for support determination of the API.

Additional features and advantages are described herein, and will be apparent from the following Detailed Description and the figures.

BRIEF DESCRIPTION OF THE FIGURES

All drawings are intended to illustrate some aspects and examples of the present disclosure. The drawings described are only schematic and are non-limiting, and are not necessarily drawn to scale.

DETAILED DESCRIPTION

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

Figure 1:
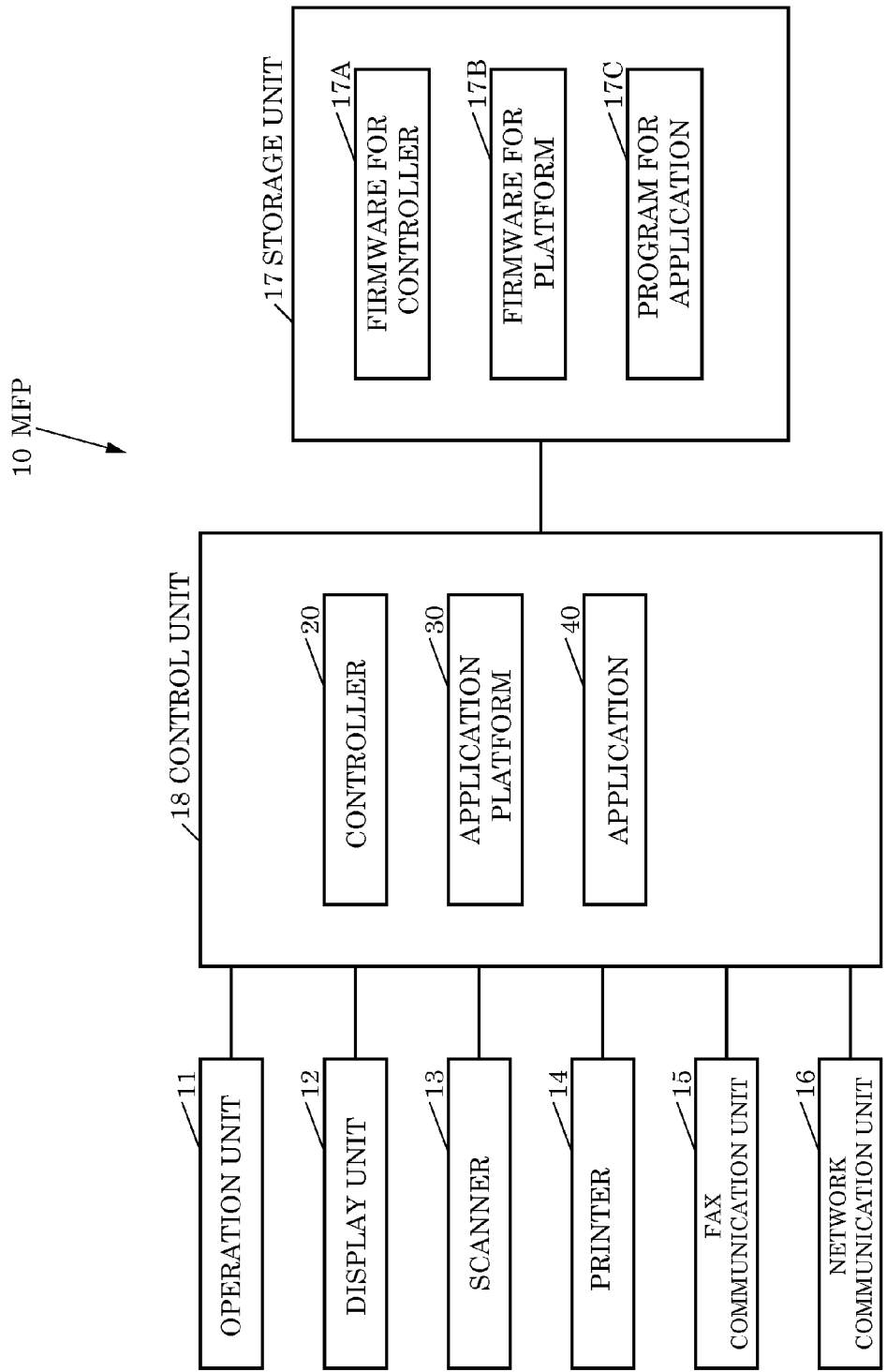
FIG. 1 is a block diagram illustrating a configuration of a multifunction peripheral (MFP) according to one embodiment of the present disclosure.

FIG. 1 is a block diagram illustrating a configuration of an MFP 10 according to one embodiment of the present disclosure.

As illustrated in FIG. 1, the MFP 10 includes an operation unit 11 functioning as an input device such as buttons through which a user inputs different kinds of operations, a display unit 12 functioning as a display device such as a liquid crystal display (LCD) that displays different kinds of information, a scanner 13 functioning as a reader device that reads an image from an original, a printer 14 functioning as a printing device that executes printing on a recording medium such as paper, a FAX communication unit 15 functioning as a FAX device that performs fax communications to/from an external facsimile machine (not shown) via a communication line such as a public telephone line, a network communication unit 16 functioning as a network communication device that performs communications to/from an external device via a network, a storage unit 17 functioning as a storage device such as an electrically erasable programmable read only memory (EEPROM) and a hard disk drive (HDD) that stores various kinds of data, and a control unit 18 that controls an entirety of the MFP 10. The operation unit 11, the display unit 12, the scanner 13, the printer 14, the FAX communication unit 15, the network communication unit 16, and the storage unit 17 form devices according to one embodiment of the present disclosure.

The storage unit 17 stores firmware for controller 17a for realizing a controller 20 described later, firmware for platform 17b for realizing an application platform 30 described later, and a program for application 17c for realizing an application 40 described later. The firmware for controller 17a, the firmware for platform 17b, and the program for application 17c may be installed onto the MFP 10 at a manufacture stage of the MFP 10, may be additionally installed onto the MFP 10 from a memory medium such as a Secure Digital (SD) card or a universal serial bus (USB) memory, and/or may be additionally installed onto the MFP 10 from the network.

The control unit 18 includes, for example, a central processing unit (CPU), a read only memory (ROM) that stores the program and various kinds of data in advance, and a random access memory (RAM) used as a work area for the CPU. The CPU is configured to execute a program stored in the ROM or the storage unit 17.

The control unit 18 executes the firmware for controller 17a stored in the storage unit 17, to thereby function as the controller 20 that executes an actual process 21 that controls the operation unit 11, the display unit 12, the scanner 13, the printer 14, the FAX communication unit 15, the network communication unit 16, or the storage unit 17. The actual process 21 is illustrated in FIG. 2 and described later.

Further, the control unit 18 executes the firmware for platform 17b stored in the storage unit 17, to thereby function as the application platform 30 that provides an application program interface (API) 31a to the application 40. The API 31a is illustrated in FIG. 2 and described later.

Further, the control unit 18 executes the program for application 17c stored in the storage unit 17, to thereby function as the application 40 that realizes a plurality of functions based on the operation unit 11, the display unit 12, the scanner 13, the printer 14, the FAX communication unit 15, the network communication unit 16, and the storage unit 17. The MFP 10 may have additional applications 40 installed to expand its functions. A plurality of applications 40 may be installed onto MFP 10.

Figure 2:
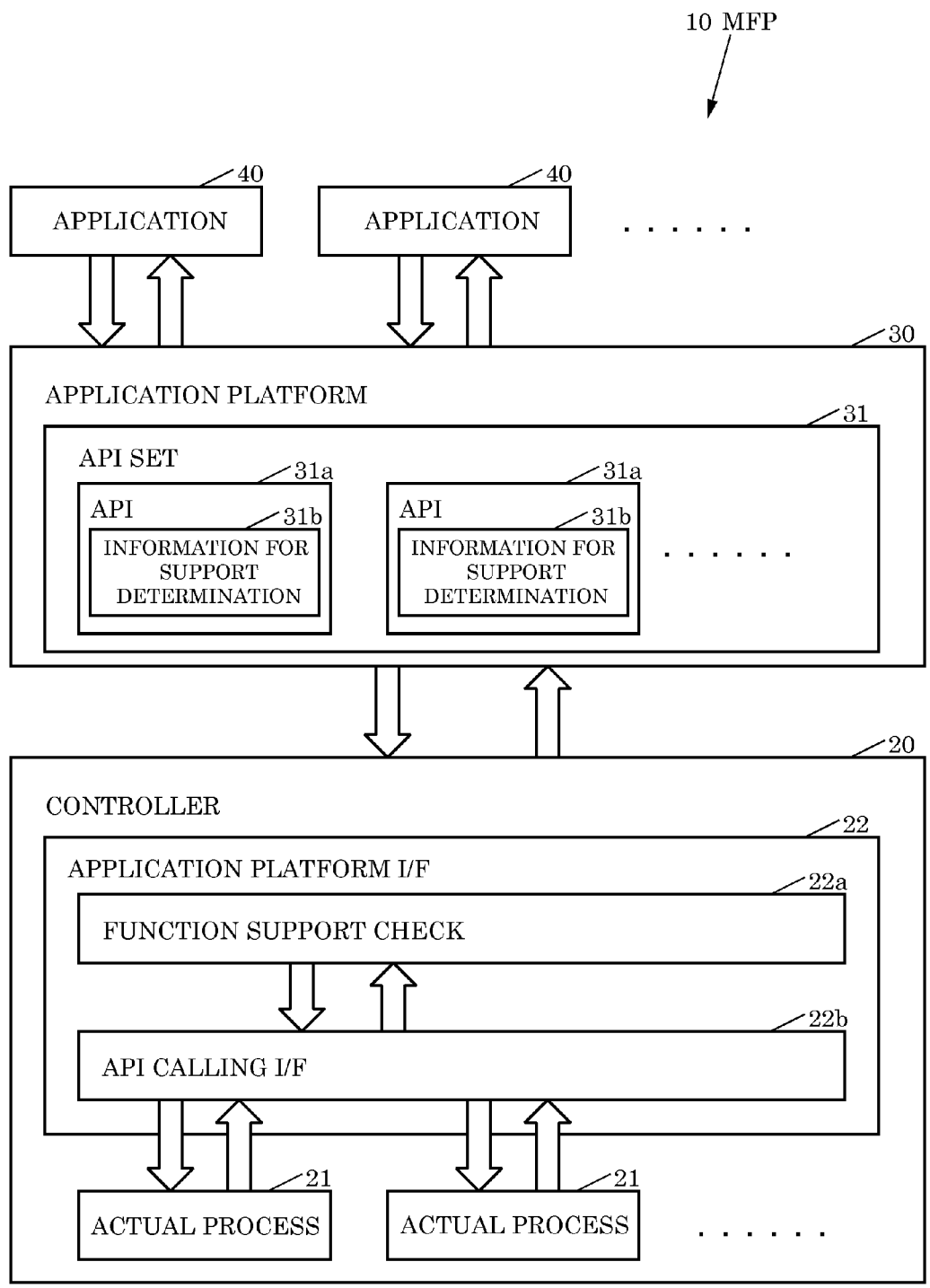
FIG. 2 is a block diagram illustrating a configuration of a system within the MFP.

FIG. 2 is a block diagram illustrating a configuration of a system within the MFP 10.

As illustrated in FIG. 2, the controller 20 includes: a plurality of actual processes 21 that realize the functions based on the operation unit 11, the display unit 12, the scanner 13, the printer 14, the FAX communication unit 15, the network communication unit 16, and the storage unit 17 such as the function of reading the image from the original by the scanner 13, the function of executing the printing of the image on the recording medium by the printer 14, the function of performing communications to/from the external device via the network by the network communication unit 16, and the function of saving electronic data by the storage unit 17; and an application platform I/F 22 that relays between the APIs 31a described later and the actual processes 21. The application platform I/F 22 includes: a function support check 22a functioning as a support determination unit for executing determination of whether or not the API 31a is supported by the MFP 10 based on information for support determination 31b, which is information to be used for the determination; and an API calling I/F 22b functioning as an actual process calling unit for calling the actual process 21 corresponding to the API 31a when the function support check 22a determines that the API 31a is supported by the MFP 10. The API calling I/F 22b stores information on correspondences between the APIs 31a and the actual processes 21.

The application platform 30 includes an API set 31 serving as a plurality of APIs 31a for calling the actual processes 21. For example, the application platform 30 is a Java (trademark) virtual machine (VM). The application platform 30 can be upgraded independently of the controller 20.

The application 40 calls a given API 31a provided by the application platform 30, to thereby cause the controller 20 to execute the actual process 21 corresponding to the given API 31a. The user of the MFP 10 is allowed to purchase a given application 40 for realizing a specific function necessary for the user's job from a developer of the given application 40 or the like, and to additionally install the given application 40 onto the MFP 10. Further, when the specific function becomes unnecessary, the user of the MFP 10 is allowed to stop the specific function or to uninstall the given application 40 for realizing the specific function from the MFP 10.

Next, a description is made of an operation of the MFP 10.

Figure 3:
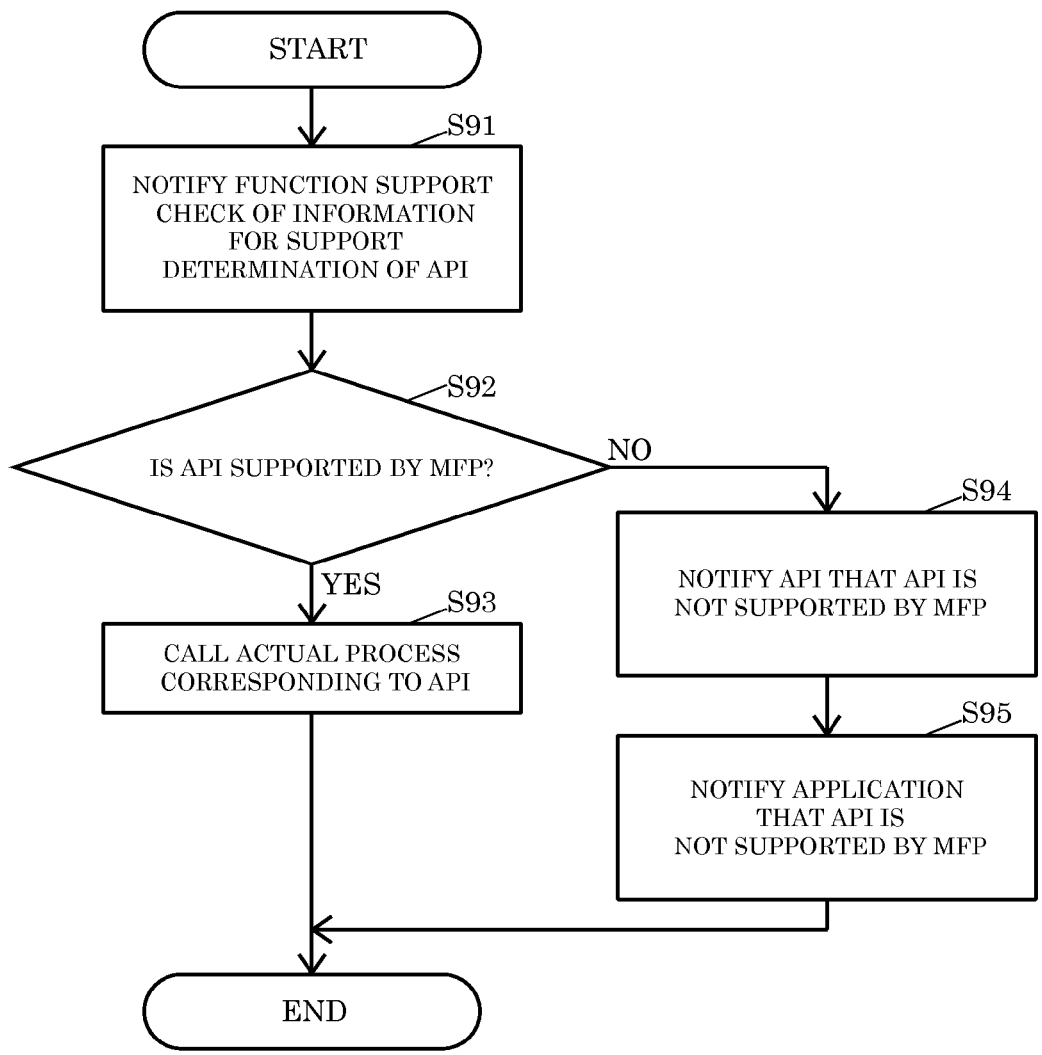
FIG. 3 is a flowchart illustrating an operation of the MFP performed when an application calls an API.

When the application 40 is executed to thereby call the API 31a, the MFP 10 executes the operation illustrated in FIG. 3.

FIG. 3 is a flowchart illustrating the operation of the MFP 10 performed when the application 40 calls the API 31a.

As illustrated in FIG. 3, the API 31a called by the application 40 notifies the function support check 22a of the information for support determination 31b of the API 31a (S91).

Subsequently, the function support check 22a executes the determination of whether or not the API 31a is supported by the MFP 10 based on the information for support determination 31b notified of in S91 (S92).

When it is determined in S92 that the API 31a is supported by the MFP 10, the API calling I/F 22b calls the actual process 21 corresponding to the API 31a (S93), and brings the operation illustrated in FIG. 3 to an end.

When it is determined in S92 that the API 31a is not supported by the MFP 10, the function support check 22a notifies the API 31a that the API 31a is not supported by the MFP 10 (S94).

Subsequently, the API 31a notifies the application 40 that the API 31a is not supported by the MFP 10 (S95), and brings the operation illustrated in FIG. 3 to an end. That is, when the called API 31a is not supported by the MFP 10, the information indicating that the API 31*a* is not supported by the MFP 10 is returned from the API 31*a* to the application 40.

Note that, the information for support determination 31*b*, of which the function support check 22*a* is notified by the API 31*a* in S91, may be a name (class name or method name) of the API 31*a* serving as identification information on the API 31*a*, which notifies the function support check 22*a* of the information for support determination 31*b*. With such a configuration that the information for support determination 31*b* is the name of the API 31*a*, the function support check 22*a* stores a list of the names of the APIs 31*a* supported by the MFP 10.

Figure 4:
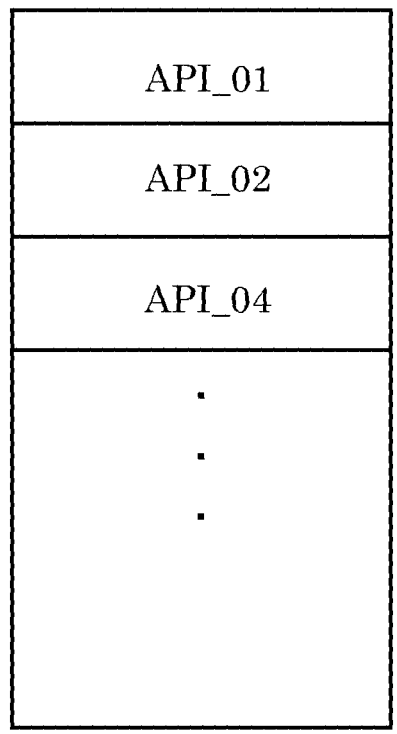
FIG. 4 is a tabular diagram illustrating an example of a list of names of APIs supported by the MFP.

FIG. 4 is a tabular diagram illustrating an example of the list of the names of the APIs 31*a* supported by the MFP 10. Note that, for example, "API_03" is not included in the list shown in FIG. 4.

If the list shown in FIG. 4 includes the name of the API 31*a* serving as the information for support determination 31*b* which is notified of by the API 31*a*, the function support check 22*a* determines in S92 that the API 31*a* is supported by the MFP 10. For example, if the function support check 22*a* stores the list shown in FIG. 4, when the name of the API 31*a* serving as the information for support determination 31*b* and notified of by the API 31*a* is "API_01", it is determined in S92 that the API 31*a* is supported by the MFP 10. When the name of the API 31*a* serving as the information for support determination 31*b* and notified of by the API 31*a* is "API_03", it is determined in S92 that the API 31*a* is not supported by the MFP 10.

Further, the information for support determination 31*b*, of which the function support check 22*a* is notified by the API 31*a* in S91, may be a version number of the API set 31 obtained when the API 31*a* that notifies the function support check 22*a* of the information for support determination 31*b* is initially added to the API set 31. With such a configuration that the version number of the API set 31 obtained when the API 31*a* is initially added to the API set 31 is the information for support determination 31*b*, the function support check 22*a* stores the version number of the API set 31 supported by the MFP 10.

Figure 5:
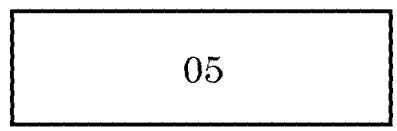
FIG. 5 is a tabular diagram illustrating an example of a version number of an API set supported by the MFP.

FIG. 5 is a tabular diagram illustrating an example of the version number of the API set 31 supported by the MFP 10.

When the version number of the API set 31 shown in FIG. 5 is greater than or equal to the version number of the API set 31 serving as the information for support determination 31*b* notified of by the API 31*a*, the function support check 22*a* determines in S92 that the API 31*a* is supported by the MFP 10. For example, if the function support check 22*a* stores the version number of the API set 31 shown in FIG. 5, when the version number of the API set 31 serving as the information for support determination 31*b* notified of by the API 31*a* is "04", it is determined in S92 that the API 31*a* is supported by the MFP 10, and when the version number of the API set 31 serving as the information for support determination 31*b* notified of by the API 31*a* is "06", it is determined in S92 that the API 31*a* is not supported by the MFP 10. That is, if the function support check 22*a* stores the version number of the API set 31 shown in FIG. 5, the function support check 22*a* determines in S92 that the API 31*a* initially added to the API set 31 whose version number is equal to or later than "06" is not supported by the MFP 10.

As described above, the MFP 10 notifies the application 40 of the API 31*a* that is not supported (S95), which allows a developer of the application 40 to implement, in advance for the application 40, an operation performed when the API 31*a* that is not supported by the MFP 10 is to be used, and hence the application 40 can be normally operated. That is, the MFP 10 reduces the necessity for the developer of the application 40 to pay attention to which model of the MFP 10 supports which API 31*a*, which can reduce load on development of the application 40.

Further, the MFP 10 notifies the application 40 of the API 31*a* that is not supported (S95), and hence the application platform 30 provided with the API 31*a* that is not supported may be provided. Therefore, the MFP 10 can reduce the necessity for the application platform 30 to be developed for each model.

Further, when the API 31*a* that is supported is called from the application 40 (YES in S92), the MFP 10 can call an actual process corresponding to the API 31*a* (S93).

Further, even when the application 40 that calls the API 31*a* that is not included in the application platform 30 is installed onto the MFP 10, by upgrading the application platform 30 to a new application platform 30 that includes the API 31*a*, it is possible to cause the application 40 to normally operate, even though there is a limitation imposed on a function realized by the application 40. That is, even with an old model of the MFP 10, by upgrading the application platform 30, it is possible to cause the application 40 to normally operate, even though there is a limitation imposed on a function realized by the application 40 for the new model.

Note that, the application platform 30 does not need to be developed for a specific model of an MFP. That is, the application platform 30 can be developed as a module common to a plurality of models of the MFP. Therefore, the MFP 10 can reduce the load on the development of the application platform 30 performed by a developer of the application platform 30.

The MFP 10 only needs to have the application platform 30 store the respective names of the APIs 31*a* when the information for support determination 31*b* is the name of the API 31*a*. Thus, the load on the development of application platform 30 can be reduced compared to an MFP 10 configured to include the version number for each API 31*a* in API set 31.

Further, with such a configuration that the version number of the API set 31 obtained at the time point when the API 31*a* is initially added to the API set 31 is the information for support determination 31*b*, the MFP 10 only needs to have the controller 20 store the version number of the API set 31 supported by the MFP 10, which can therefore reduce the load on the development of the controller 20 compared to a configuration where the controller 20 stores the list of the names of the APIs 31*a* supported by the MFP 10.

This embodiment employs the MFP as an image forming apparatus of the present disclosure, but an image forming apparatus other than the MFP, such as a dedicated printer, a dedicated copier, or a dedicated FAX machine, may be employed.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus comprising:
a plurality of devices, wherein the plurality of devices includes a printing device operable to execute printing on a recording medium;

a storage device configured to store a controller firmware, a platform firmware, and application instructions;

a control unit that includes at least one central processing unit (CPU), wherein the control unit is configured to execute the controller firmware to operate as a controller, wherein the controller is configured to execute a plurality of actual processes that control the plurality of devices, wherein the control unit is configured to execute the application instructions to operate as an application, wherein the application realizes a plurality of functions based on the plurality of devices, wherein the control unit is configured to execute the platform firmware to operate as an application platform, wherein the application platform includes a set of APIs configured to call the plurality of actual processes, wherein the application platform is configured to provide each API from the set of APIs to the application, wherein the application platform is configured to be upgraded independently of the controller, wherein each API from the set of APIs includes information for support determination, and wherein the controller includes a support determination unit that determines, for an API from the set of APIs, whether the API is supported by the image forming apparatus based on the information for support determination of the API.

2. The image forming apparatus according to claim 1, wherein, for a given API from the set of APIs, the given API is configured to notify, when called by the application, the support determination unit of the information for support determination of the given API;

wherein the support determination unit is configured to determine whether the given API is supported by the image forming apparatus based on the information for support determination of the given API;

wherein the support determination unit is configured to notify, when determining that the given API is not supported by the image forming apparatus, the given API that the given API is not supported by the image forming apparatus; and wherein the given API is configured to notify, when notified by the support determination unit that the given API is not supported by the image forming apparatus, the application that the given API is not supported by the image forming apparatus.

3. The image forming apparatus according to claim 1, wherein the controller includes an actual process calling unit that calls one of the plurality of actual processes that corresponds to a given API from the set of APIs when the support determination unit determines that the given API is supported by the image forming apparatus.

4. The image forming apparatus according to claim 1, wherein, for a given API from the set of APIs, the information for support determination of the given API includes a piece of identification information that notifies the support determination unit of the information for support determination of the given API; and wherein the support determination unit is configured to determine that the given API is supported by the image forming apparatus when the piece of identification information of the information for support determination of the given API matches a piece of identification information within a list of pieces of identification information corresponding to a plurality of APIs supported by the image forming apparatus.

5. The image forming apparatus according to claim 1, wherein, for a given API from the set of APIs, the information for support determination of the given API includes a version number of the set of APIs obtained when the given API is initially added to the set of APIs; and wherein the support determination unit is configured to determine that the given API is supported by the image forming apparatus when the version number of the set of APIs supported by the image forming apparatus is a number greater than or equal to the version number of the information for support determination of the given API.

6. A method carried out by a central processing unit (CPU) of an image forming apparatus upon execution of program instructions comprising:

providing a plurality of devices, wherein the plurality of devices includes a printing device operable to execute printing on a recording medium;

storing, via a storage device, a controller firmware, a platform firmware, and application instructions;

executing, by the CPU, the controller firmware to cause the CPU to operate as a controller, wherein the controller is operable to execute a plurality of actual processes that control a plurality of devices;

executing, by the CPU, the application instructions to cause the CPU to operate as an application, wherein the application realizes a plurality of functions based on the plurality of devices;

executing, by the CPU, the platform firmware to cause the CPU to operate as an application platform, wherein the application platform is operable to (i) call the plurality of actual processes via a set of APIs, and (ii) provide each API from the set of APIs to the application via an application platform, wherein the controller includes a support determination unit that determines, for an API from the set of APIs, whether the API is supported by the image forming apparatus based on the information for support determination of the API, wherein the application platform is configured to be upgraded independently of the controller.

7. The method according to claim 6 further comprising:

notifying, for a given API from the set of APIs, when called by the application, the support determination unit of the information for support determination of the given API via the given API;

determining whether the given API is supported by the image forming apparatus based on the information for support determination of the given API via the support determination unit;

notifying, when determining that the given API is not supported by the image forming apparatus, the given API that the given API is not supported by the image forming apparatus via the support determination unit; and notifying, when notified by the support determination unit that the given API is not supported by the image forming apparatus, the application that the given API is not supported by the image forming apparatus via the given API.

8. The method according to claim 6, wherein the controller includes an actual process calling unit that calls one of the plurality of actual processes that corresponds to a given API from the set of APIs when the support determination unit determines that the given API is supported by the image forming apparatus.

9. The method according to claim 6,
wherein, for a given API from the set of APIs, the information for support determination of the given API includes a piece of identification information that notifies the support determination unit of the information for support determination of the given API.

10. The method according to claim 9 further comprising:
determining, for a given API from the set of APIs, that the given API is supported by the image forming apparatus when the piece of identification information of the information for support determination of the given API matches a piece of identification information within a list of pieces of identification information corresponding to a plurality of APIs supported by the image forming apparatus via the support determination unit.

11. The method according to claim 6,
wherein, for a given API from the set of APIs, the information for support determination of the given API includes a version number of the set of APIs obtained when the given API is initially added to the set of APIs.

12. The method according to claim 11 further comprising:
determining, for a given API from the set of APIs, that the given API is supported by the image forming apparatus when the version number of the set of APIs supported by the image forming apparatus is a number greater than or equal to the version number of the information for support determination of the given API via the support determination unit.

* * * * *